3,052,484
UTILITY CARTS WITH MULTIPLE PIVOTED
LOAD SUPPORTS
Levi D. Huffman, Grand Rapids, and Linwood L. Reed, Albion, Mich., assignors to Union Steel Products Company, Albion, Mich.
Filed July 11, 1960, Ser. No. 41,959
3 Claims. (Cl. 280—36)

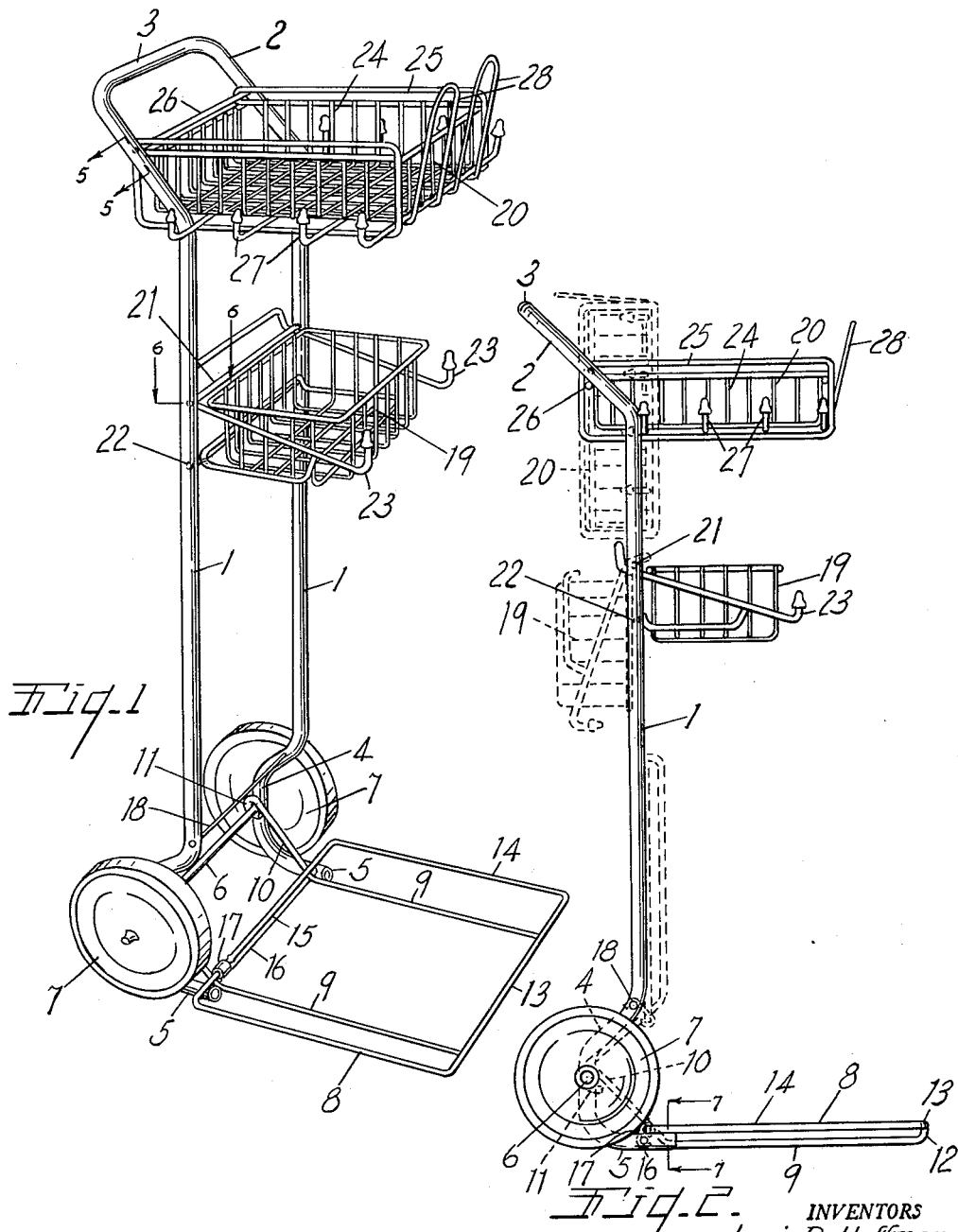

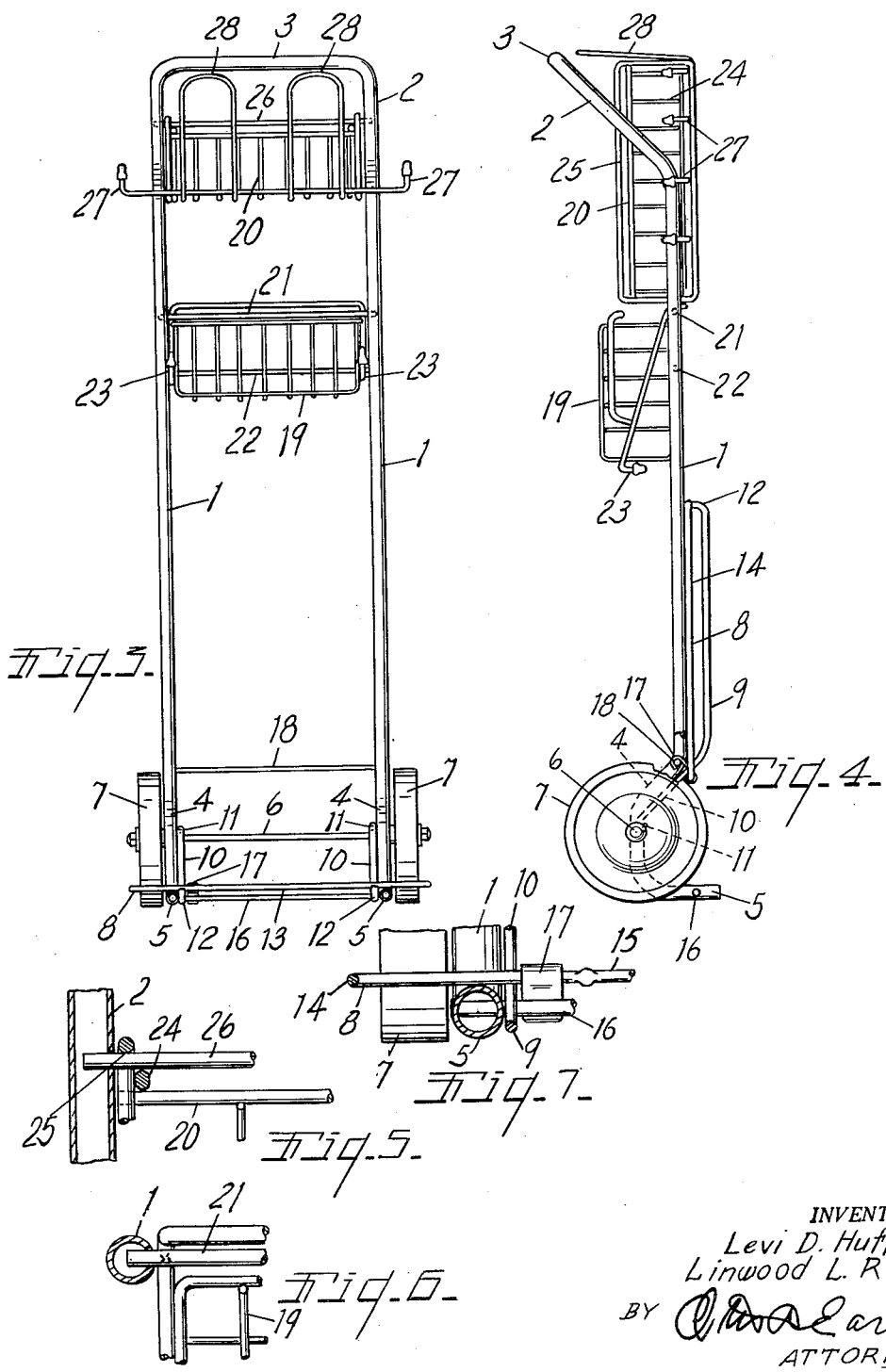

This invention relates to carrier carts of the type that have become known or generally designated as utility carts.

The main objects of this invention are:

First, to provide a utility cart which is well adapted for use in homes, hotels, motels and the like, to support for translation various kinds of cleaning devices and materials.

Second, to provide a cart of this type which is relatively light in weight and convenient to manipulate and at the same time capable of sustaining relatively heavy loads.

Third, to provide a structure which may be quite compactly collapsed for packaging for shipment and for storage and may be quickly erected for use.

Objects relating to details and economies of the invention will appear from the description to follow. The invention is defined and pointed out in the claims.

A preferred embodiment of the invention is illustrated in the accompanying drawing, in which:

FIG. 1 is a front perspective view of a structure embodying our invention in erected position.

FIG. 2 is a side elevational view with the parts shown in erected position by full lines and in collapsed position by dotted lines.

FIG. 3 is a front elevational view.

FIG. 4 is a side elevational view with parts in collapsed position.

FIG. 5 is an enlarged fragmentary view partially in section on a line corresponding to line 5—5 of FIG. 1.

FIG. 6 is an enlarged fragmentary view partially in section on a line corresponding to line 6—6 of FIG. 1.

FIG. 7 is an enlarged fragmentary view partially in section on a line corresponding to line 7—7 of FIG. 2.

In the embodiment of our invention illustrated the frame comprises laterally spaced side bars 1—1 having rearwardly inclined upper end portions 2 connected by the cross piece 3 which constitutes a handle. At their lower ends the side bars 1 have rearwardly offset forwardly facing U-shaped base members 4, the lower arms 5 of which constitute foot pieces. In the embodiment illustrated these several members are formed integrally of tubular stock.

The axle 6 extends between the bight portions of the offsets 4 with the ends thereof projecting from the side bars to receive the wheels 7 which are of such diameter that they coact with the foot pieces 5 in supporting the frame in upright position as is illustrated.

The bottom support member designated generally by the numeral 8 comprises the side pieces 9 having upwardly offset arms 10 on their rear ends terminating in eyes 11 pivotally engaging the axle 6. These members 9 have upturned front ends 12 to which the front cross member 13 of the frame like support member 15 is fixedly secured. The rear cross piece 15 is secured to the arms 10 and is adapted to rest upon the base members 5 when the bottom support member is in erected position as is illustrated.

A rod 16 extends between the front ends of the foot pieces 5. A hook 17 is pivotally mounted on the rear cross piece 15 of the bottom support member and is engageable with the rod 16 when the parts are in erected position so that the bottom support member projects forwardly from the frame members and is adapted to receive pails and other objects to be transported. It also serves as a stabilizing extension for the foot pieces 5.

With the hook 17 disengaged the bottom support member may be collapsed upwardly against the side bars as shown by dotted lines in FIG. 2 and by full lines in FIG. 4, and the hook 17 engaged with the cross rods 18 extending between the side members.

In the embodiment of our invention illustrated, a pair of receptacles designated generally by the numerals 19 and 20 are provided. Both of these receptacles are mounted to be adjusted to erected position projecting forwardly from the frame, as is illustrated in FIGS. 1, 2 and 3, or to be collapsed as is illustrated by full lines in FIG. 4 and dotted lines in FIG. 2. Both of these receptacles are formed of wire and the particular details thereof are not described other than as involved in the mounting and manipulation thereof and as to the hangers associated therewith.

The lower receptacle 19 is swingably supported by the crossrod 21 which extends between and pivotally engages the side bars 1, the frame being provided with a crossrod or crosspiece 22 which constitutes a supporting stop for the receptacle 19 when it is in erected position. The receptacle 19 is, in the embodiment illustrated, provided with upwardly facing hanger hooks 23.

The side walls 24 of the upper receptacle 20 are provided with elongated slot-like openings 25 at their upper edges through which the cross rod 26 extending between the rearwardly inclined portion 2 of the side bars is disposed. This provides a pivotal and slidable support for the upper receptacle 20 so that is may be swung to erected position, as is illustrated, or to collapsed substantially vertical position.

This receptacle is provided with laterally projecting upwardly facing hooks 27, the rearward hooks constituting stops engaging the side bars for supporting the receptacle in erected position. The upper receptacle is also provided with outwardly projecting springable holder members 28 with which articles to be supported may be engaged.

In adjusting the receptacles from erected to collapsed position and vice versa, the lower receptable is the first to be collapsed and the last to be erected. The lower receptacle is adjusted from collapsed to erected position merely by swinging on its pivot 21. It is supported in its erected position by its pivot and its thrust engagement with the crossrod 22.

In collapsing the upper receptacle it is pivotally swung to an upright position and then lowered vertically to the position illustrated in FIGS. 2 and 4, and in erecting the operation is reversed.

We have illustrated and described our invention in a highly practical embodiment thereof. We have not attempted to illustrate and describe various modifications or adaptations which we contemplate as it is believed that this disclosure will enable those skilled in the art to embody or adapt the invention as may be desired.

What is claimed as new is:

1. In a utility cart, a frame comprising laterally spaced side bars having rearwardly inclined upper end portions provided with a head piece, said side bars having rearwardly offset forwardly facing U-shaped base members, the lower arms of which constitute foot pieces, a cross piece extending between said foot pieces, an axle extending between the bight portions of said base members, wheels on said axle coacting with the foot pieces thereof to support the frame in upright position, a bottom support member comprising side pieces pivotally mounted on said axle, a support member fixedly mounted on said side pieces and supportedly engaging said foot pieces when the supporting member is in erected position, a hook on said bottom support member detachably engageable with said crosspiece for holding said bottom support member in its erected position, said bottom support member being swingably collapsible into substantially parallel side by side relation to said frame side bars, a rod extending between said side bars and constituting a keeper with which said hook may be engaged when said bottom support member is in collapsed position, a first receptacle pivotally mounted on said side bars in spaced relation from their upper ends and swingable therebetween from erected forwardly projecting position to a collapsed position rearwardly of the side bars and vice versa, and a second receptacle pivotally and slidably mounted on said rearwardly inclined portions of said frame side bars and provided with stop means engaging said side bars when it is in erected position.

2. In a utility cart, a frame comprising laterally spaced side bars having rearwardly inclined upper end portions provided with a hand piece, said side bars having rearwardly offset forwardly facing U-shaped base members, the lower arms of which constitute foot pieces, an axle extending between the bight portions of said base members, wheels on said axle coacting with the foot pieces to support the frame in upright position, a bottom support member pivotally mounted on said slde members and supportedly engaging said foot pieces when the support member is in erected position, said bottom support member being swingably collapsible into substantially upright side by side relation to said frame side bars, and a receptacle pivotally and slidably mounted on said rearwardly inclined portions of said frame side bars to and from an erected position projecting forwardly from said side bars or to a collapsed position rearwardy of said side bars.

3. In a utility cart, the combination of a frame comprising laterally spaced side bars provided with a hand piece at their upper ends and with translating wheels at their lower ends, a first receptacle pivotally mounted on said side bars in spaced relation to their upper ends and swingable therebetween from a forwardly projecting erected position to a collapsed position rearwardly of the side bars, coacting stop members on said first receptacle and side bars for supporting the receptacle in erected position, said receptacle being provided with hinged members which face upwardly when the receptacle is in erected position, and a second receptacle mounted on said side bars for pivotal and sliding adjustment to and from a substantially vertical collapsed position and provided with a plurality of laterally projecting hangers, the rearmost of which constitutes stops engaging the frame side members for supporting the second receptacle in erected position.

References Cited in the file of this patent

UNITED STATES PATENTS

| | | |
|---|---|---|
| D. 165,191 | Reece | Nov. 13, 1951 |
| 1,428,180 | More | Sept. 5, 1922 |
| 1,638,805 | Hausman | Aug. 9, 1927 |
| 2,212,053 | Smith | Aug. 20, 1940 |
| 2,633,249 | Reed | Mar. 31, 1953 |
| 2,676,026 | Goldman | Apr. 20, 1954 |
| 2,786,692 | Timpson | Mar. 26, 1957 |
| 2,792,233 | Stackhouse | May 14, 1957 |
| 2,798,651 | Wasyluk | July 9, 1957 |
| 2,818,955 | Stackhouse | Jan. 7, 1958 |
| 2,921,694 | Decker | Jan. 19, 1960 |

FOREIGN PATENTS

| | | |
|---|---|---|
| 720,993 | Great Britain | Dec. 29, 1954 |